United States Patent
Kim et al.

(10) Patent No.: US 6,894,624 B2
(45) Date of Patent: May 17, 2005

(54) PASSIVE TRANSPONDER IDENTIFICATION AND CREDIT-CARD TYPE TRANSPONDER

(75) Inventors: Ji-Tae Kim, Seoul (KR); Dong-Seog Jeong, Gyeonggi-do (KR)

(73) Assignee: Credipass Co., Ltd., Seoul (KR)

(*) Notice: Subject to any disclaimer, the term of this patent is extended or adjusted under 35 U.S.C. 154(b) by 296 days.

(21) Appl. No.: 10/049,458

(22) PCT Filed: Jun. 1, 2001

(86) PCT No.: PCT/KR01/00928

§ 371 (c)(1),
(2), (4) Date: Jun. 24, 2002

(87) PCT Pub. No.: WO02/03560

PCT Pub. Date: Jan. 10, 2002

(65) Prior Publication Data

US 2003/0006901 A1 Jan. 9, 2003

(30) Foreign Application Priority Data

| Jul. 4, 2000 | (KR) | 2000/38071 |
| Mar. 23, 2001 | (KR) | 2001/15300 |
| Mar. 23, 2001 | (KR) | 2001/15301 |

(51) Int. Cl.[7] .............................................. G08G 1/01
(52) U.S. Cl. .................. 340/933; 340/572.5; 340/10.1; 340/10.3; 340/10.4
(58) Field of Search .................. 340/572.5, 572.1, 340/10.1, 10.3, 10.4, 933; 342/42

(56) References Cited

U.S. PATENT DOCUMENTS

| 4,506,148 A | | 3/1985 | Berthold et al. ............ 235/380 |
| 5,101,200 A | | 3/1992 | Sweet ........................ 340/937 |
| 5,939,984 A | * | 8/1999 | Brady et al. ............. 340/572.1 |
| 6,114,971 A | * | 9/2000 | Nysen ....................... 340/10.3 |
| 6,144,332 A | * | 11/2000 | Reindl et al. ................. 342/42 |
| 6,483,427 B1 | * | 11/2002 | Werb ......................... 340/10.1 |

* cited by examiner

Primary Examiner—Anh V. La

(57) ABSTRACT

A passive transponder identification system and credit card type transponder are disclosed, particularly, the transponder identification system to utilize a transmitting manner of two different RF signals is provided. The present invention directly relates to a passive transponder without any kind of power source. Therefore, the present invention has advantages of having a constant gain value by developing a high-gain dual polarizing antenna for a small credit card type passive transponder to identify at long distance, independently to any direction of the transponder; improving gain values than conventional transponder tag antenna by 6–9 dB to ensure a sub-permanent life time by providing the desired identification performance by a small credit card type passive transponder without power supply; and being applicable to any systems to identify and distinguish high-speed moving objects.

14 Claims, 17 Drawing Sheets

Tuning with f1 and f2 ($\lambda/4$)

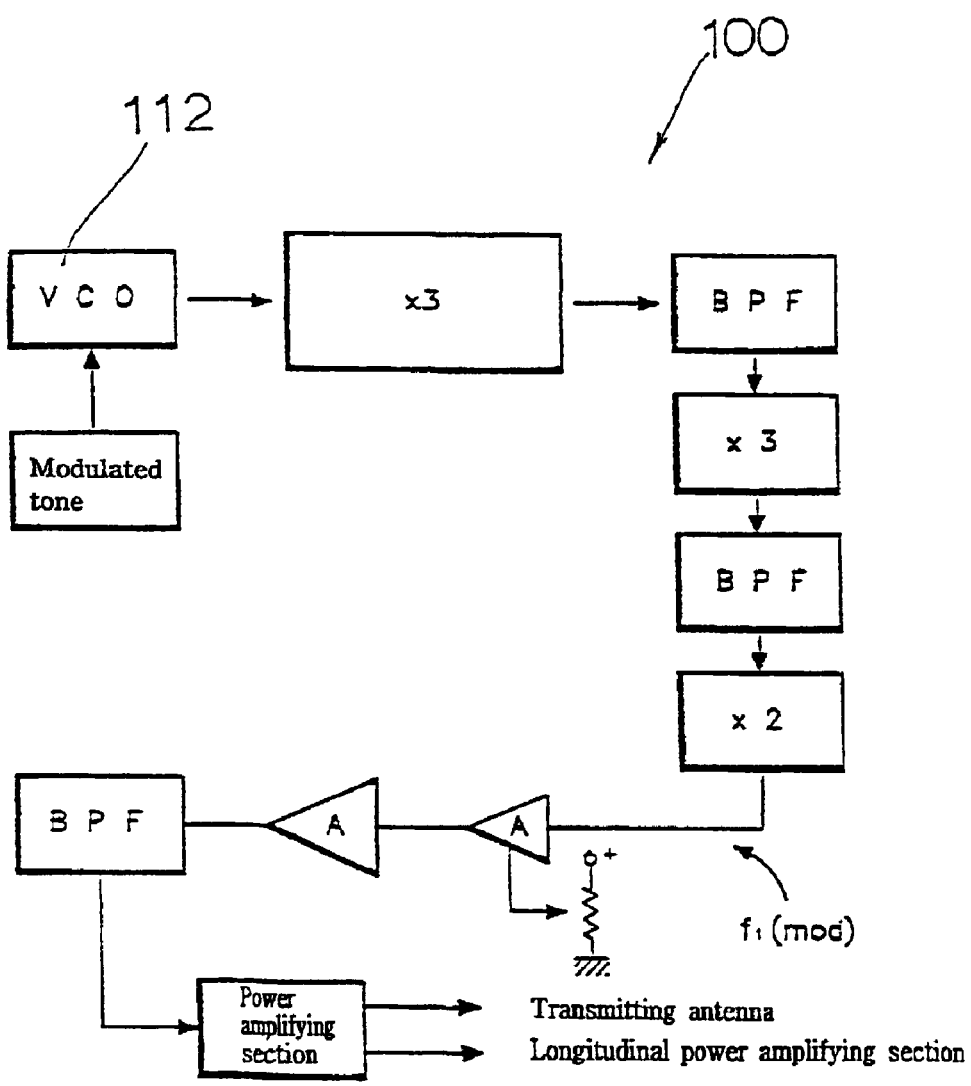

PASSIVE TRANSPONDER IDENTIFICATION AND CREDIT-CARD TYPE TRANSPONDER

FIELD OF THE INVENTION

The present invention relates to a passive transponder identification system operated by storage of information and transmission of inherent number and a credit card type transponder, and more particularly, to a radio frequency ("RF") passive transponder useful in ID proximity card, pass card for bus or subway, and the like, which should recognize or identify at close distance, simultaneously with IC card.

BACKGROUND OF THE RELATED ART

Such system requires remote-control transponder installed with subminiature transmitter-receiver circuits capable of being carried in any moving objects therein. Particularly, the present invention provides a passive transponder to identification technique at relatively long range and high-speed driving objects.

Conventional transponder identification system transmits a single radio frequency to detect by antenna such as transponder tag, and non-linear impedance of semiconductor diode used for this generates selectively high frequency ("HF") of transmitted signals which is re-radiated to be detected by receiving device. Such identification system has a shortage of practically not used due to occurrence of reading error at responding to sensitivity and different conditions to ensure detection of transponder within detection area.

It is importantly noticed that the transmitter-receiver circuit and element thereof are non-linear and generate HF signal as well as fundamental transmitting frequency and results the signals input into the receiver, even for transponder without non-linear impedance element. If sensitivity of the receiver is lowered to reduce the effect of harmonics directly radiated, weak-energy harmonics re-radiated by the passive transponder element will be absorbed in the former and not reach to the receiver. Of course, such problem may be minimized by ideally shielding the transmitter and the receiver and/or by means of RF Filtering circuit. However, the filter has a problem of causing even small frequency shift of the transmitted signals to easily serve as re-radiation frequency present outside of the filter pass-band, thus requiring very sophisticated shielding capability. Furthermore, frequency shift may be resulted from Doppler effect occurred in the transponder moving at high speed within the detection area. While these harmonic signals easily transmitting to the outside cause undesired data information to be radiated from any transponder beyond the detection area.

Consequently, HF energy which transmits by unexpected reflection such as multi-stationary wave is not effective to accomplish the original purpose of the system.

On the contrary, if insufficient amount of energy is received or re-radiated by harmonics, the system may not respond even the transponder element being actually present, within the detection area. For example, such condition may happen when antenna of the transponder antenna is unsuitably orientating corresponding to transmission field or is electro-magnetically blocked from receiver by nearby vehicles, partition wall on road, interception bar of toll gate and so on. Also, in case the transponder coming close to human body or metallic objects, it deflects tuning of a resonant tank circuit to result the dissipation of HF energy required by receiver. Although the transponder may be constructed to control frequency response from the receiver so to compensate frequency alteration by means of signal tracking circuit, the work efficiency of the transponder is decreased whenever the tuning tank circuit is run at any frequency other than normal one.

Alternatively, as a solution to overcome the problem to restrict HF transmission within the detection area in which non-linear impedance element acting as a signal mixer to generate summed or subtracted frequency between both transmitting signals having different frequencies each other is present, double field system using low frequency ("LF") electro-statistic field formed between discontinuous conductors arranged opposite to the HF electro-magnetic field and the detection area is adaptable. The non-linear impedance element applied to such two fields serves often as a mixer to generate summed or subtracted frequency to be re-radiated to the receiver.

However, even though power consumed in the detection area is important to form electro-statistic field required within the detection area, such field may be unfortunately prevented from the transponder by conductor enclosing it or conversed from the transponder by traffic signs made of metallic materials or other metal structures around.

In addition, LF field is likely to be under reading error or immobile condition at long distance by nearby metal structures.

SUMMARY OF THE INVENTION

Accordingly, the present invention is directed to a passive transponder identification system, in particular, a transponder identification system utilizing a manner for transmitting two different RF signals, that substantially obviates one or more problems due to limitations and disadvantages of the related art.

An object of the present invention is to make either of such RF signals to be tone-modulated and received by the passive transponder, the resulted signal being mixed through non-linear impedance to be re-radiated at the same high frequency with the sum frequency of both RF signals and identified by means of narrow-bandwidth receiver.

The invention directly relates to a passive transponder having no kind of power supply.

Another object of the present invention is to provide a passive transponder including non-linear impedance element such as semiconductor IC (integrated circuit), for example, a tag used in any identification system for mobile objects such as vehicles, the transponder being connected to a micro strip antenna shifted toward both sides of the selected center frequency.

Such non-linear impedance element connects both sides of closed loop area at one end of the antenna in order to form a tuning tank circuit having a frequency higher than the selected frequency by 2 times as the resonant frequency thereof.

Further, the first transmitter generates tone-modulated high frequency biased or polarized to one side of the center frequency while the second transmitter generates continuous wave(CW) high frequency polarized to the other side of the center frequency. Such both signals are independently and suddenly turned to dipole antenna strips perpendicular to each other arranged to cover desired area. The said dipole strips are aligned at a right angle to each side at individual frequencies, and, at the same frequency, positioned perpendicular to the opposite side. Therefore, it is resulted that cross-polarized transmission is successfully performed at both frequencies within the requisite detection area.

Two different frequencies received by the passive transponder is combined by means of non-linear impedance element. The tank circuit resonates to a single high frequency identical to sum of such two frequencies and 2 times higher than the center frequency. The generated resonant frequency is re-radiated to be identified by the interrogator. This is detected by super narrow-bandwidth receiver in which data information produced and loaded in the passive transponder responds to the sum frequency.

The modulated tone including data signals introduced from the passive transponder creates charges progressively increasing from the receiving signal, in order to compare it with reference level pre-set to output the received data code in a certain interval only when the signal detected has sufficient signal intensity and continuous time.

The present invention relates to an interrogator and a transponder identification system, especially, more improved passive identification system utilizing non-linear impedance semiconductor element connected to any printed dielectric micro-strip antenna attached to objects such as front glass or license number plate, parcels, patient in hospital, animals, credit card and the like, which requires monitoring and identification. The system has information stored in digital manner.

In another aspect of the present invention, a system to detect cars or other objects existing within the detection area includes a transmitter 100 to radiate two RF signals having different frequencies in said area from a transmission antenna 110, either of the signals being modulated to a certain LF, and alternative antenna 210 tuning to two different center frequencies, wherein a non-linear impedance semiconductor circuit part 220 inserted into said antenna 210 combines both RFs, and the system further comprises a narrow-bandwidth receiver 300 including a receiving antenna 310 which tunes data tone, re-radiates it to the combined frequency, excludes RF signal and harmonics to detect the modulated signal of two frequencies, and receives and demodulates the modulated signal.

One of such RF signals transmitted is the tone modulated high frequency f1 and the other is the continuous wave from the fixed RF f2 (non-modulated CW). LF modulation results continuous tone-modulated RF signals and restricts them within a defined frequency range.

Such both different harmonics signals are transmitted from a dielectric dipole transmission antenna 110 to a detection area, one of them f2 being oscillated from high stability alteration oscillator 111 at fixed frequency (i.e., 905 MHz) toward CW, as shown in FIG. 5. Said signal is polarized from the center frequency by about 1%. The other one f1 is the tone-modulated signal ranged of 1–25 kHz to form high frequency signals biased by ±5 kHz from carrier frequency. The high frequency of 925 kHz is made by VCO (Votage Controlled Oscillator) 112 illustrated in FIG. 4. Both frequencies are uniformly polarized by the center frequency selected. As a result, a mean center frequency of such signals is equal to the selected center frequency.

The tone-modulated signal f1 controls the occurrence of stationary wave causing blind spot within an area detected by the passive transponder 200.

Such transponder 200 comprises charge pump circuits 230, the passive dielectric substrate folded dipole antenna 210 and the non-linear impedance semiconductor circuit part 220, the charge pump circuits 230 being connected to a longitudinal part placed in a space surrounded by close loop area faced each other to provide a tank circuit to tune with the second harmonics resonant frequency. Such charge pump circuit 230 consists of a capacitor and an inductance. Alternatively, the non-linear impedance circuit part 220 consists of a non-linear impedance semiconductor 220A, a Schottky diode D and condensers C1, C2 and a power supply part equipped inside such semiconductor 220A.

Said narrow-bandwidth receiver 300 is, as illustrated in FIG. 6, comprises a carrier signal receiving antenna 310, a filter 311 to intercept all signals other than the narrow-bandwidth signal created by the resonant frequency of said transponder 200, a demodulator in which detection of signal widths is performed to compare together widths of the receiving signals filtered and to detect said LF modulation only when over the preset reference level, and respond depending on the result of comparison-determination by a comparator 312. In this regards, "detection" means detection of LF modulation. The detection function is applied to the digital data signals overlapped by the narrow-bandwidth receiver 300 as a means to initiate the pre-determined digital stream so that it indicates the passive transponder 200 existing within the detection area whenever the intensity or duration of signals which were produced in the transponder 200 and detected by the narrow-bandwidth receiver 300 exceed lower limits thereof preset.

Moreover, said receiver 300 includes a band pass filter 311 to prevent signals except the one within the narrow-bandwidth received by the receiving antenna 310 and generated in the resonant circuit of the transponder, a series of means consisting of a local oscillator 314 to produce intermediate frequency IF for demodulating signals within the pass-band of said filter 311, multipliers 315,316, filters 317,318 and a mixer 319, an amplifier 320 to amplify said the IF signal, alternative amplifiers 321,322 to compare and determine width of IF, a comparator 312 to generate LF signal only when the width of comparison-output exceeds a pre-determined threshold, and a discriminator 323 to correct the narrow-bandwidth which responds depending on the comparison-determination output to demodulate said IF. The above LF signal is one of RF signals within a narrow range of frequency deviation limit which forms a constant tone modulation. Said narrow-bandwidth receiver 300 can accept a phase locked telecommunication way by VOC 327 to tune with said constant tone frequency and activate an amplifier 340 connected to the output in order to allow digital data stream to run for a constant period.

In a further aspect of the present invention, the system to detect the passive transponder 200 being within the detection area comprises a transmitter 100 existing within the detection area to produce and radiate narrow-bandwidth RF as a carrier frequency modulated by the constant LF tone. The transponder 200 responding to a frequency signal from the transmitter 100 can be radiated by said transmitter 100 in order to generate and re-radiate a carrier signal by using different harmonics; the signal re-radiated capable of forming fixed LF tone. The receiver system 300 consists of the narrow-bandwidth filter 311 to block the carrier signal re-radiated by said harmonics in order to produce output filtered responding to the re-radiated signal received by the antenna 310 which receives such re-radiated carrier signal and the signal received by the antenna 310 even to the frequency not limited to the narrow-bandwidth frequency; and a demodulating means responding to output comparison level, the means allowing the LF signal to be created and demodulating said filtered output only when the comparator 312 acts exceeding the pre-determined threshold value.

On the above, such receiver system has several demodulating means responding to the observation on said LF modulation signal to activate output for minimum time after the observation initiates. The narrow-bandwidth RF signal consists a stable carrier modulated by a fixed audio-tone. The narrow-bandwidth filter 311 includes a local oscillator 314, a mixer 319 to create IF signal and a correction filter 324 signaling IF; two or more means to perform comparison-determination within the pass-band by detecting width thereof and to amplify IF signals to demodulate signal from the correction filter, said demodulation means corresponding to widths of output from such correction filter 324. The demodulation means comprises a clamp circuit 325 responding to the comparison-determination function to fix output of a narrow-bandwidth RF discriminating device and a correction discriminator 323 so that a fixed-tone demodulation signal develops at occurring output. Such comparison-determination by the comparator 312 passes through when the determined value exceeds the threshold value.

In addition, such demodulation means of the receiving system 300 activates digital data stream output for a constant time period; the digital data code stream being ranged from 64 bits to 16 kilobits dependent to a memory circuit 220A (semiconductor) attached inside the transponder 200. FIG. 6 shows a data detector 328, a bit error detector 342 and a low-pass filter 342.

In such construction of the system as described above, an elongated antenna zone extending over the non-linear impedance circuit part 220 for the second harmonics (for this invention, 1830 kHz) and the charge pump circuit 230 is approximately λ/4 relative to the selected center frequency (for the present case, 915 kHz), as shown in FIG. 3; the circuit part 220 being determined by the capacitance of semiconductor 220A and the inductance of the close-loop area adjacent to the antenna 210 and the circuit part 220.

FIG. 3 illustrates an impedance of transmission line Z of 500 ohms and HF rectified DC current flows I1, I2. A short-circuit diode D provides the rectified current given by f1, f2 into a power supply part of such semiconductor 220A to carry out mixing+frequency doubling+data stream adding processes to send the rectified current toward the receiver. The semiconductor 220A is loaded with data by the power of charge pump f1(mod)+f2 formed by means of such short-circuit detection diode D.

It is more important that an operation method to use both frequencies can reduce drifting effect of a transmitting frequency and increase bandwidth of the system in the efficiency aspect of the transponder for re-radiating an incident HF signal of a Back scatter. Particularly, the frequency tuned with antenna 210 of the transponder 200 can be present in any location between two frequencies transmitted without excessive reduction of the efficiency of said transponder; thus, it needs no use of accurate antenna to be manufactured while problems relating non-tuning could be reduced to a minimum. In this regard, common tuning point of the transponder 200 is polarized toward the lower side of two frequencies due to dielectric loading effect of any object adjacent to the transponder. For example, if it was re-tuned downward the selected center frequency of said antenna of the transponder 200, it could increase the efficiency of the transponder 200 relative to any transmitting frequency lower than it. The entire mixer is not seriously influenced by this condition because the desired mixing performance is developed by 10 or more of HF power ratio. Therefore, the drifting effect of the transmitter is minimized by such manner described above. In other words, unlikely the harmonics re-radiated in a single frequency system, the shift in frequency of the transmitter is not multiplied and the drift at one frequency can be offset by the opposite shift of the other transmitter.

Re-radiated signal of the transponder 200 has an intensity and frequency stability sufficient to remove dual-identification error possible in cooperation with a collision-avoidance software of corresponding receiver and provide the maximum sensitivity and the minimum bandwidth of the receiver. Such re-radiated signal passes through very narrow band-pass filter to intercept the transmitting frequency into the antenna 310 receiving circular polarization; the received signal being amplified by normal demodulation techniques to produce modulation data tone. In general, audio-tone (i.e., 2 kHz) is available to modulate RF carrier wave to apply a signal (i.e., 1808.5 kHz) from a stable local oscillator 314 to a passive mixer receiving input signal, so that it makes signal filtered and amplified from the antenna 310 of said receiver to create preferable IF (i.e., 21.5 kHz) at output of the mixer 319. IF output from the mixer 319 is amplified by an amplifier 320, subsequently passes a narrow band-pass filter 324 (i.e., 30 kHz) defining a pre-detection bandwidth and a correction discriminator 323 to carry out discrimination performance; and is clamped by a clamp circuit 325 until it has an intensity sufficient to create voltage(potential) of AGC detector 326 in excess of reference level set up for determining the sensitivity of system. Then, by opening the clamp circuit 325, VCO 327 is applied to PLL/Data-tone detection circuit (consisted of VCO 327 and Free amble detection circuit 313) having a free running frequency equal to data-tone and capable of gaining a stable data-tone within a narrow range of frequency such as ±10%. If loop gets the data-tone, a rectangular detector acquires digital information from CPU and transferred into a phase locked state to output the received transponder data information having continuance ability sufficient to be stored.

Additional advantages, objects, and features of the invention will be set forth in part in the description which follows and in part will become apparent to those having ordinary skill in the art upon examination of the following or may be learned from practice of the invention.

The objectives and other advantages of the invention may be realized and attained by the structure particularly pointed out in the written description and claims hereof as well as the appended drawings.

BRIEF DESCRIPTION OF THE DRAWINGS

In the drawings;

FIG. 4 is a flow chart illustrating signal stream of a transmitter having modulated tone as shown in FIG. 1 in functional roles of parts thereof;

FIG. 7b is a side view of such credit card shown in FIG. 7a;

FIG. 15b is a front view illustrating same as shown in FIG. 15a.

[Numerical Description of Main Components]

Figure 1:
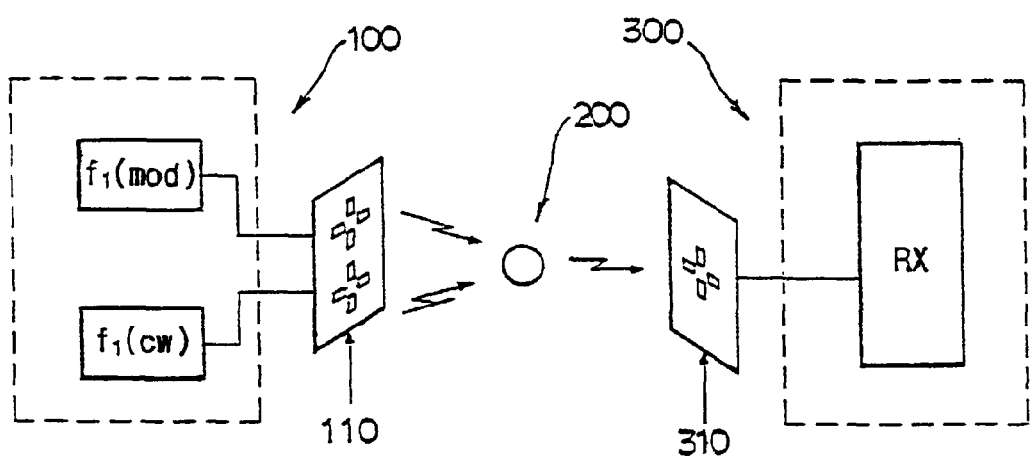
FIG. 1 is a block diagram schematically illustrating the entire construction of an interrogator and a transponder of the present invention.
Figure 2:
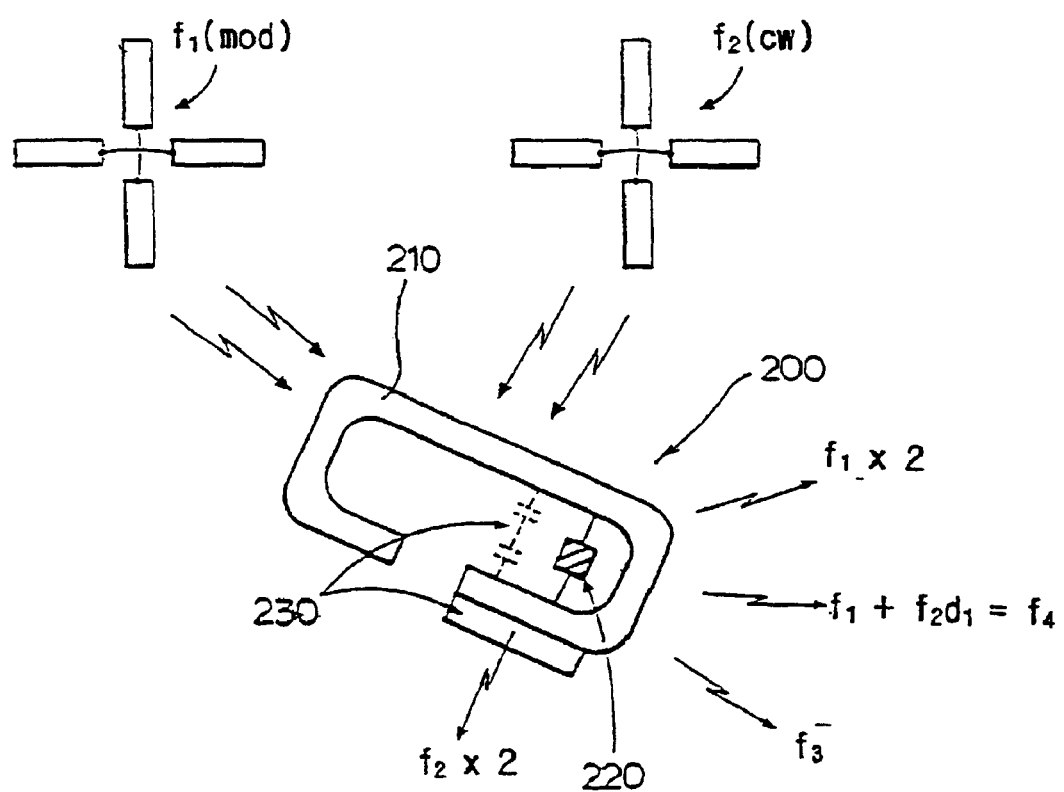
FIG. 2 is a concept drawing illustrating the mechanism to radiate two different RF frequencies in said interrogator and to re-radiate the added frequency thereof in said transponder.
Figure 3A:
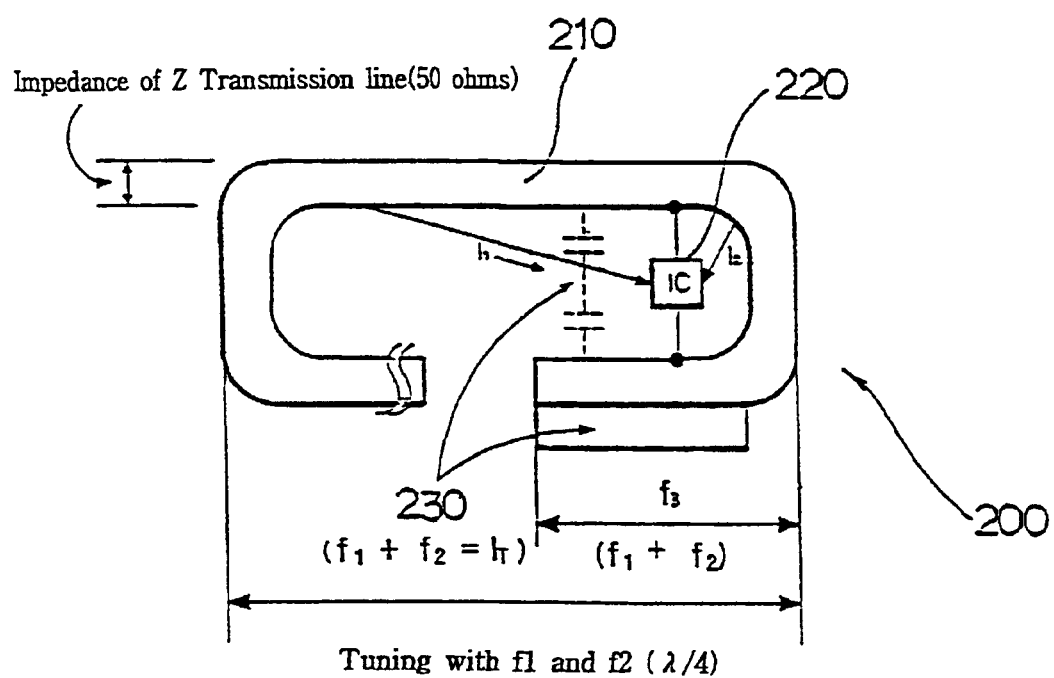
FIG. 3a is a block diagram schematically illustrating performance of the transponder of the present invention.
Figure 3B:
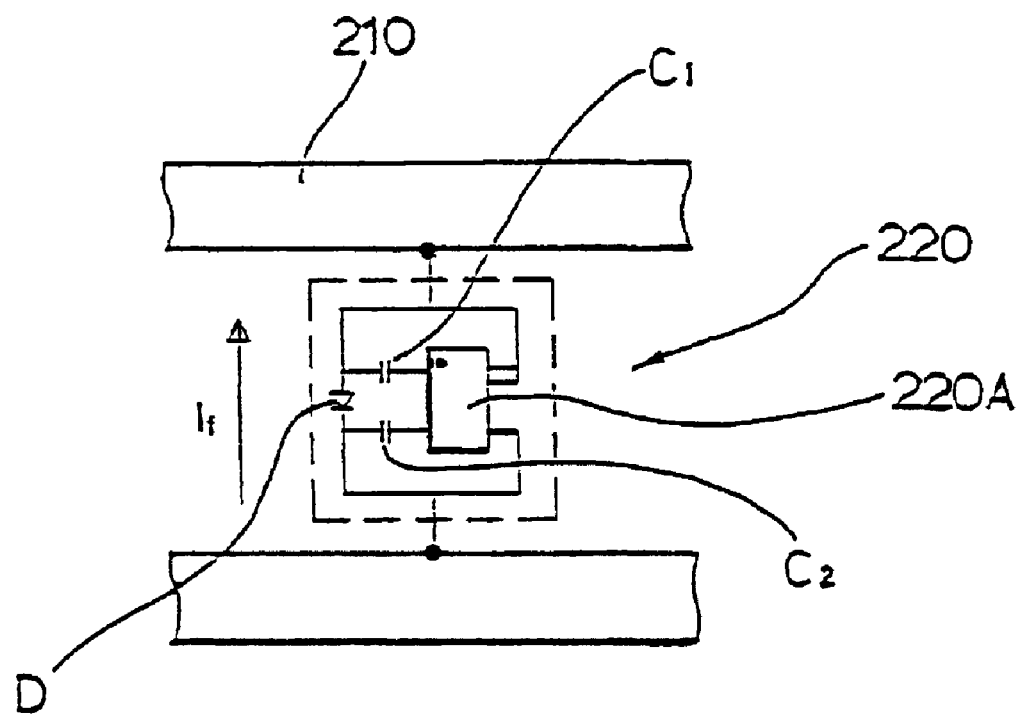
FIG. 3b is a construction drawing practically showing non-linear impedance semiconductor circuit part of the present invention.
Figure 5:
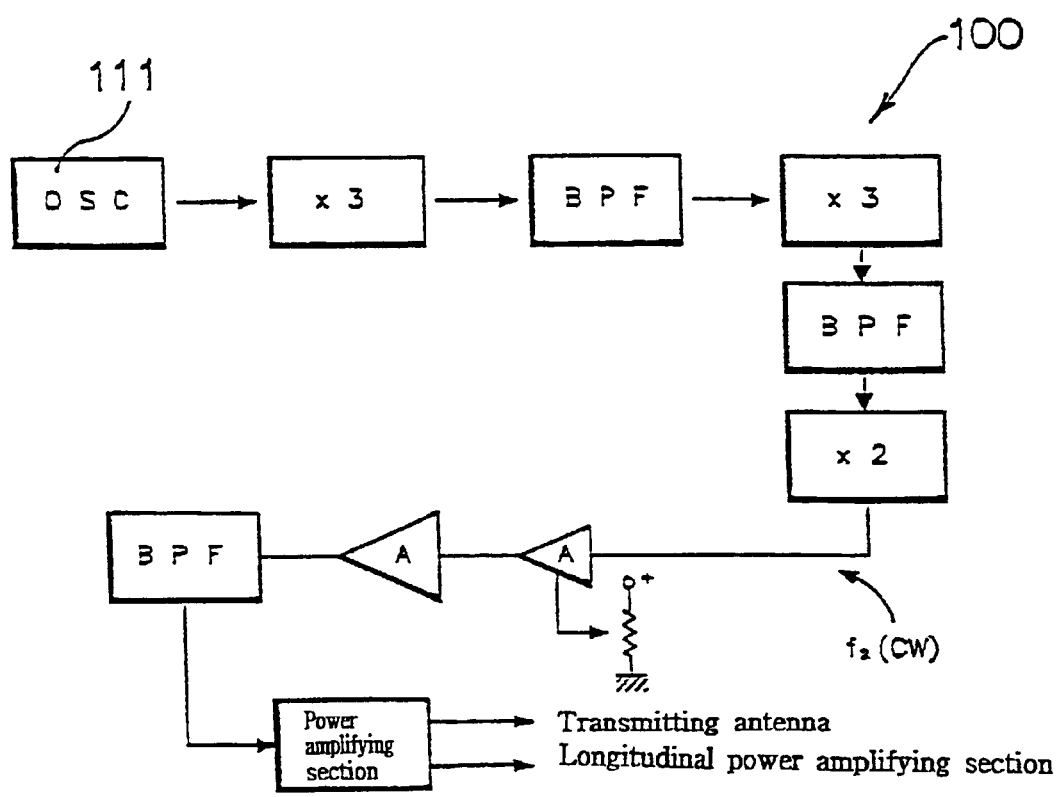
FIG. 5 is a flow chart illustrating signal stream of alternative transmitter having continuous wave as shown in FIG. 1 in functional roles of parts thereof.
Figure 6:
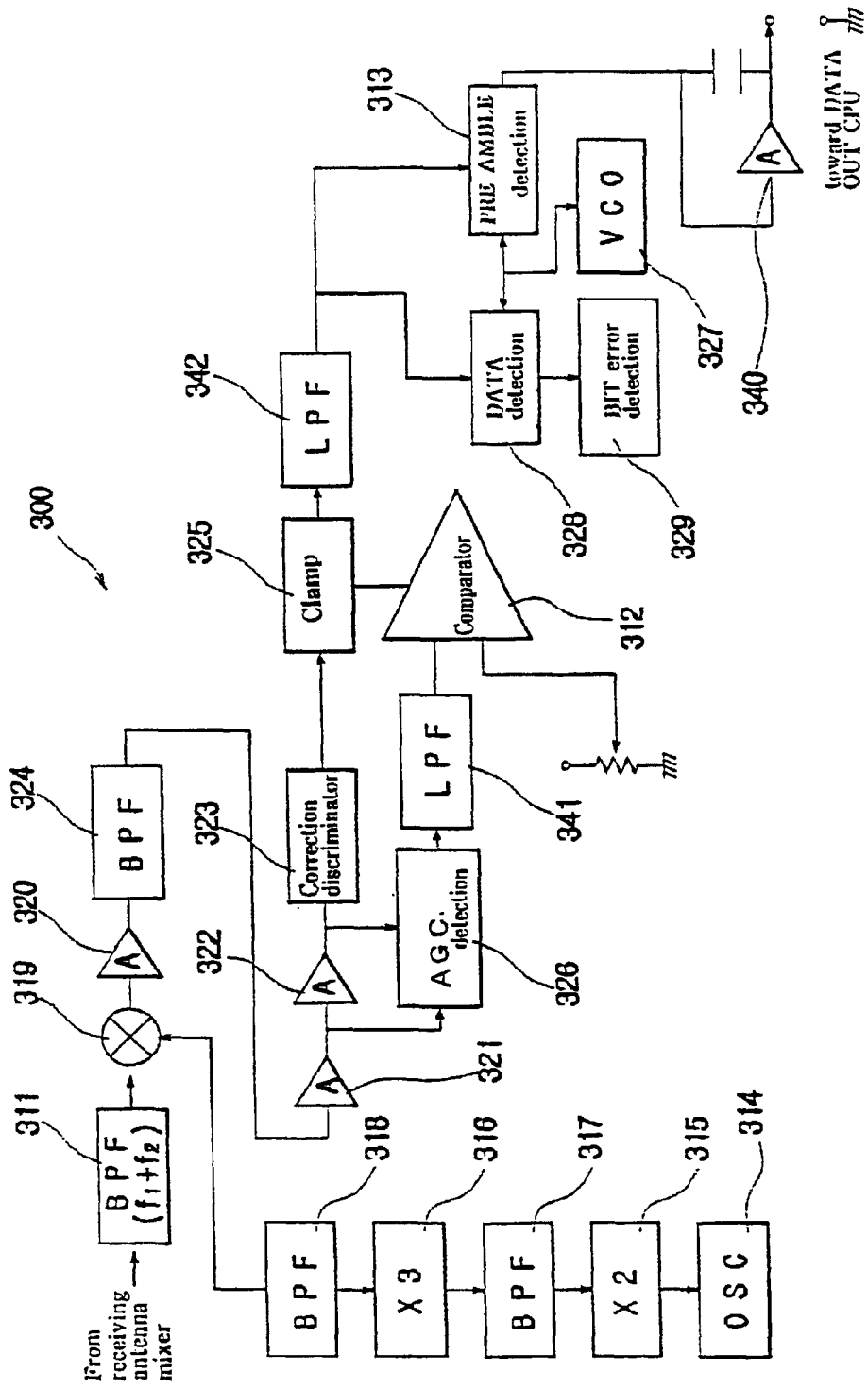
FIG. 6 is a flow chart illustrating signal stream of a receiver having modulated data as shown in FIG. 1 in functional roles of parts thereof.

| | | | |
|---|---|---|---|
| 10: | credit card | 11: | magnetic band |
| 31: | card clip | 32: | card holding stand |
| 33: | card pocket | 40: | interrogator |
| 41: | identification processing computer | | |
| 42: | charging and management computer | | |
| 43: | central computer | | |
| 45: | plate number photographing system (video system) | | |
| 46: | financial information computer network (VAN) | | |
| 100: | transmitter | | |
| 110: | transmitting antenna | | |
| 200: | transponder | | |
| 210: | dielectric folded dipole antenna (metal antenna) | | |
| 211: | dipole resonant antenna | | |
| 212: | slot antenna | | |
| 213: | data slot antenna | | |
| 220: | non-linear impedance semiconductor circuit | | |
| 230: | charge pump circuit | | |
| 300: | narrow bandwidth | | |
| 310: | receiving antenna | | |
| 311: | filter | | |
| 313: | free amble detecting circuit | | |
| 314: | local oscillator | | |
| 319: | mixer | | |
| 323: | correction discriminator | | |
| 325: | clamp circuit | | |
| 328: | data detector | | |

DETAILED DESCRIPTION OF THE INVENTION

Reference will now be made in detail to the preferred embodiments of the present invention, examples of which are illustrated in the accompanying drawings.

[Example 1]

In this example as an embodiment of the present invention, a credit card type transponder is equipped with RF Remote Identification System ("RFID") using RF to identify at long distance.

More particularly, the system utilizes the open area of a micro-strip antenna to a maximum and accomplishes the greatest radiation efficiency by properly arranging two slots and two dipole antennas and matching the resonant point relative to the secondary harmonics of the received wave; and receives beam power radiated from an interrogator to the highest degree within a small size of card so that it can eliminates the low efficiency problem of conventional system which uses Back Scatter having the same transmitting/receiving frequencies as its carrier; characterized in that it consists of dual-polarization antenna formed by arranging said two slot resonant antennas perpendicular to each other to constantly manage the accepted power dependent on the direction of antennas and to ensure remote identification performance.

This system is usually divided into a passive type transponder system which receives Beacon transmitted from the interrogator, converses high frequency("HF") of the Beacon into DC power source to run logic and memory semiconductor, then, modulate and transmit inherent information into such Back Scatter; and a semi-passive and/or active type transponder system which uses alternative power supply at a tag of the transponder part as the working power for the memory semiconductor.

In general, such transponder system is widely used in any short-distance applications such as subway and/or bus pass card, ID proximity card, parking lot and automobile control system with a built-in battery, animal caring system, warehousing management system and is on the increase of demand for application. Also, various type antennas are used; for example, a small tag type antenna in using at a certain adjacent distance and a coil type loop antenna for LF, while being under a process of high frequency (HF), the antenna is such a micro strip or dipole antenna type having its gain ranged from −3 to +3 dBi and using the linear type antenna for polarizing side.

The HF passive transmitting/receiving system to identify ones personal identity by means of Back Scatter has a restriction that it has no more than about 5 meters as the upper limit of identification distance, in spite of its benefit to be applicable in various applications, so that the known passive system is insufficient and has limitations such as the reduction of identification range and the lowered identification rate, etc.

In order to apply the system to high-speed object, it may possible to utilize active type transmitting/receiving system or semi-active type one with a built-in battery or alternative power supply to identify high-speed object or object at a long distance, such as OBU (On Board Unit) taking charge of RF telecommunication part.

Such active or OBU types are limited to its application due to the difficult problem in connection with miniaturization (size-reduction) of the transmitting/receiving system; not ensure the durability against deterioration of the active elements; and, in particular, although the system is able to be reduced its size by using the battery for clock, the problems involving durability or stability of battery and shortening of life time thereof still exist since the life time of battery is directly influenced by such identification distance or number of times to be used.

In addition, the system with a built-in battery is impossible to be manufactured into any kind of credit cards.

Further, since antenna of the transmitting/receiving system equipped with the battery is of linear pattern to use straight-polarization, its alteration of gain remarkably increases dependent on the relative direction of transponder to interrogator to cause the identification distance being reduced as another difficult problem.

The present invention is proposed to solve the above-mentioned inconvenience.

An object of the present invention is to provide a system to utilize the open area of a micro-strip antenna to a maximum and to accomplish the greatest radiation efficiency by properly arranging two slots and two dipole antennas and matching the resonant point relative to the secondary harmonics of the received wave; wherein said system receives beam power radiated from an interrogator to the highest degree within a small size of card so that it can eliminates the low efficiency problem of conventional system which uses Back Scatter having the same transmitting/receiving frequencies as its carrier; characterized in that it consists of dual-polarization antenna formed by arranging said two slot-resonant antennas perpendicular to each other to constantly manage the accepted power dependent on the direction of antennas and to ensure remote identification performance.

Consequently, the present invention is characterized in that the antenna is designed and manufactured by covering both sides of the copper of aluminum thin plate with PVC material and applying a micro strip and slot-resonant circuit to the PVC covered plate to result a credit card type product.

Practically, with regard to the design and manufacture of antenna for the transponder card, it comprises a metal antenna combined of tapered slot antenna, dipole antenna and integrated circuit; comprising to arrange two tapered slot antennas perpendicular to each other to form dual-polarization in consideration with voluntary orientation to handle and place the credit card; to widen the open area enough to match with the size of credit card to increase the receiving HF power to its maximum degree; to position two dipole antennas to increase the transmission gain; further, in order to accept the information marked by embossing at issuing the credit card, to make both sides of the copper thin plate of 0.1 mm or less thickness to be matched with the dielectric constant value of PVC materials covering the copper plate.

As mentioned above, the present invention relates a passive type transponder to identify objects by means of a mechanism comprising transmitting Beacon from an interrogator and conversing the received HF Beacon into DC power source to activate logic and memory semiconductor to modulate and transmit inherent information to Back scatter.

Figure 7A:
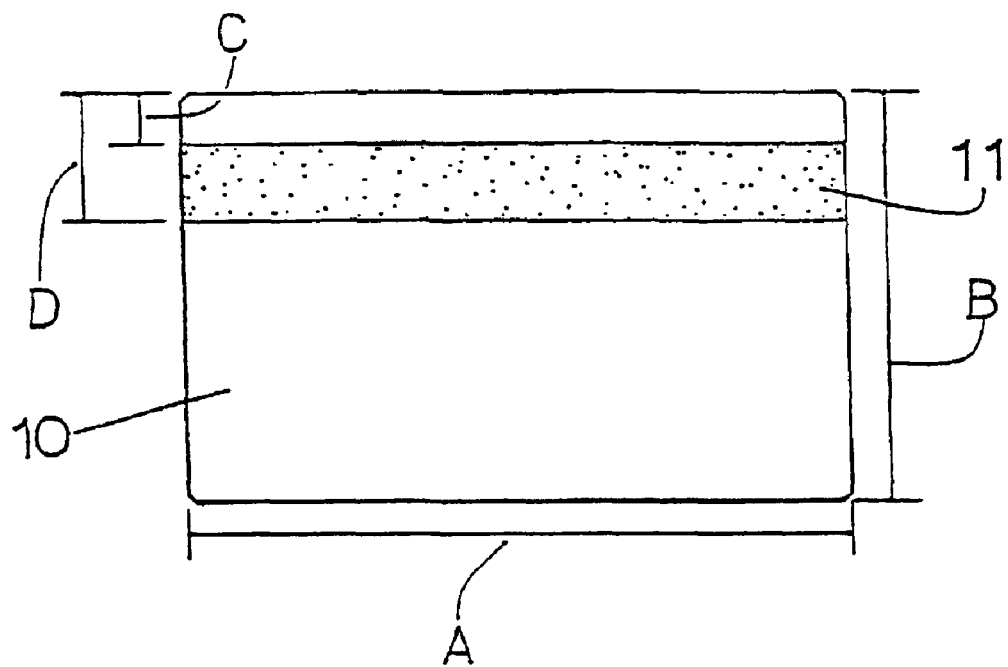
FIG. 7a is a front and standard view illustrating outward appearance of a conventional credit card.
Figure 7B:
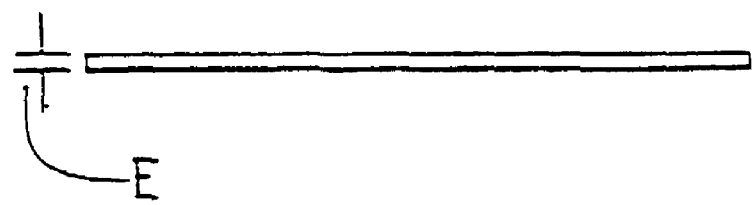
Figure 8A:
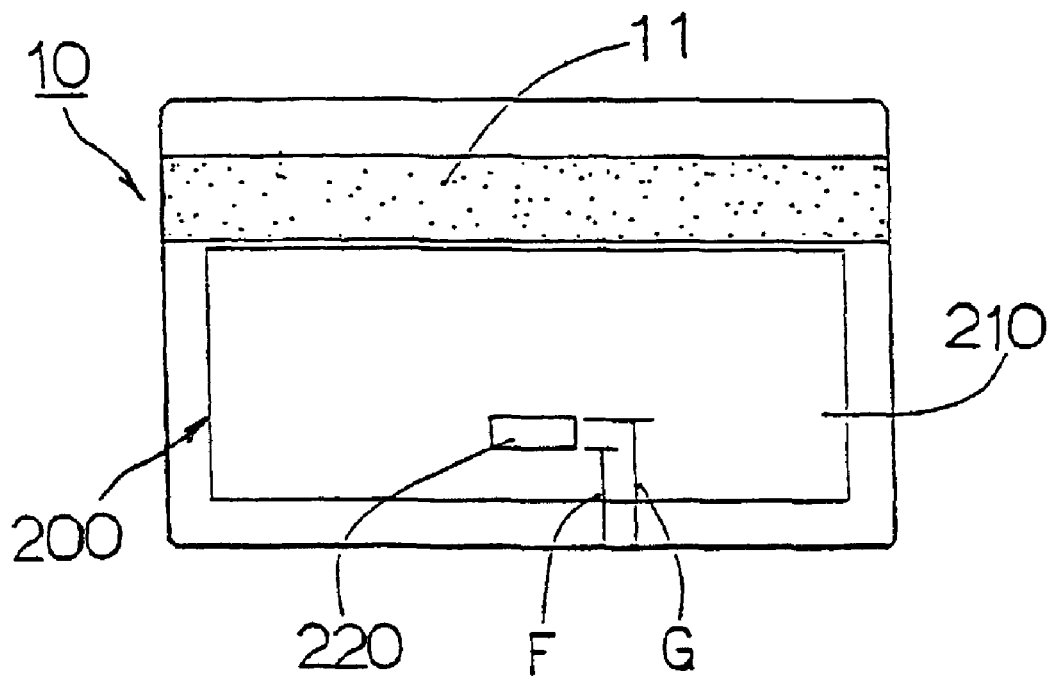
FIG. 8a illustrates a block planning drawing of high-gain antenna of the present invention to be arranged into a credit card.

Conventional credit card, as shown in FIG. 7a, having a dimension of 85.6±0.12 mm (A)×53.98±0.55 mm (B) and consisted of a magnetic band 11 having min. 5.54 mm (C) and max. 15.82 (D). A passive transponder of the present invention is inserted into to an existing credit card 10 having a thickness of 0.76±0.08 mm (E) as illustrated in FIG. 8a. In this regard, a dielectric folded dipole antenna (made of metal material) 210 of the transponder should direct faced to the magnetic band 11 at its imaginary contact surface and be located on lower part of the card 10 to allow sufficient amount of electromagnetic beam to be generated at the open side of the slot.

Moreover, a non-linear impedance semiconductor circuit part (integrated circuit: IC) for the transponder, as shown in FIG. 8b as side view of the credit card 10, is arranged between min. 14 mm (F) and max. 19 mm (G) apart form edges of and within the card made of PVC materials, together with thin plate-shaped antenna 210, as shown in FIG. 8a, so that it prevents the effect of character embossing on the credit card 10.

Figure 9:
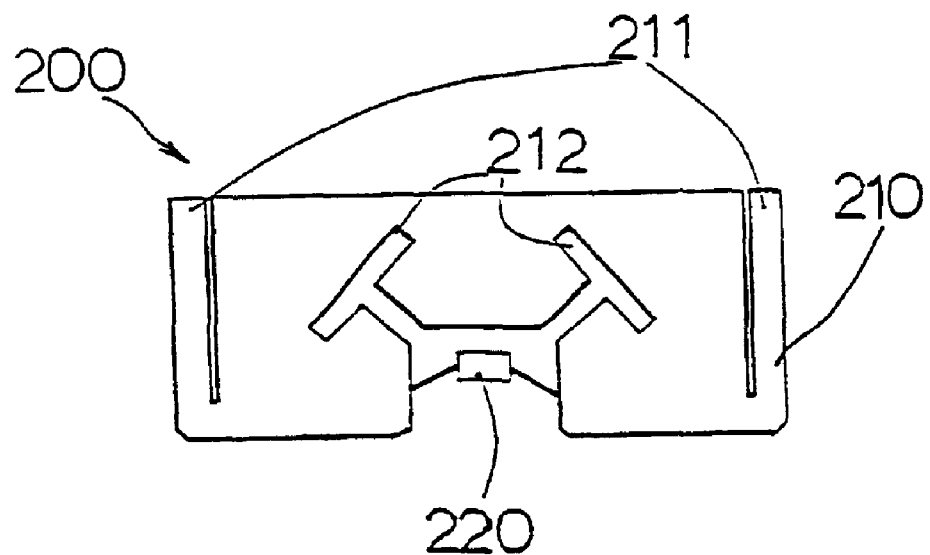
FIG. 9 illustrates a constructional drawing of a high-gain antenna of the present invention.
Figure 10:
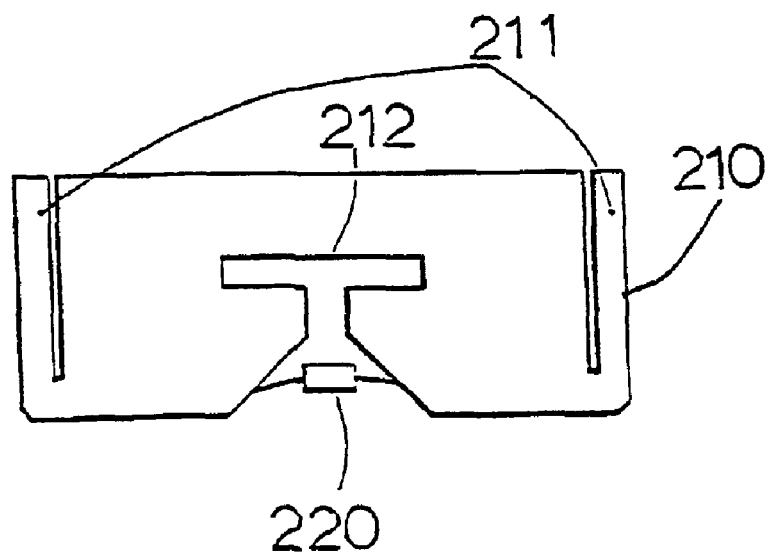
FIG. 10 illustrates a constructional drawing of alternative principle antenna.

Alternatively, FIGS. 9 and 10 show the structure of antenna 10 inserted into the credit card 10. The passive transponder 200 is power supplied by RF bandwidth of an interrogator (not shown) and the power being required to activate the semiconductor circuit part 220; and consumes the energy to transmit response code by the antenna 210 and other non-linear elements impedance modulation; is constructed of antenna 210 and at least one of semiconductor circuit part 220, the construction and features of the antenna 210 being defined by physical and/or chemical properties or action-demanding frequency of the materials enclosing the transponder.

In other words, as illustrated in FIGS. 9 and 10, the HF RFID transponder of 400 MHz–25 GHz is built in the credit card 10 to use it as a general credit card, as well as applies conveniently in various systems such as tollgate or toll road charging system, gas station accounting system, parking lot charging and management system and the like, without connecting to alternative telecommunication apparatus.

Figure 8B:
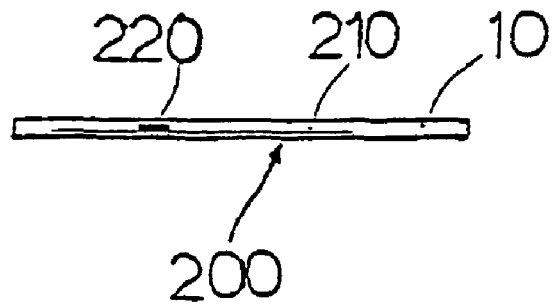
FIG. 8b is a cross-sectional view illustrating the manufacturing process of remote identification credit card available in the present invention.

A slot antenna 212 having a thin plate shaped slot structure useful in 400-25 GHz HF RFID and an antenna 211 having dipole structure and, in addition to, the circuit part 220 placed at center part of the slot are equipped within PVC material at wider side of the card 10 and/or various ID proximity card relative to the magnetic band 11, as shown in FIGS. 8a, 8b.

Figure 11:
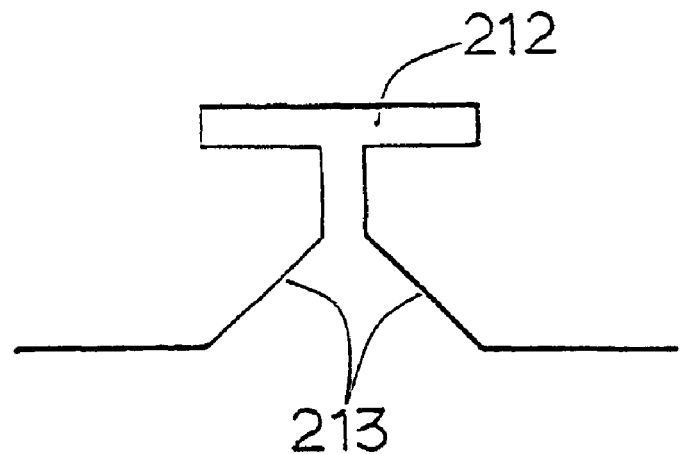
FIG. 11 is another cross-sectional view illustrating the antenna of the present invention in its constructional parts.

And, FIG. 11 shows an antenna inserted into the credit card 10. The antenna is made of copper thin plate or other similar conductive materials to construct a slot antenna 212 corresponding to λ/4 wavelength at center part thereof; and to form horn shaped tapered slot antenna 213.

Besides, as shown in FIG. 9, in order to increase transmission gain and reduce or substantially eliminate orientation problem of the antenna, two slot antennas 212 are arranged at right angle to form dual polarization and constructs twp dipole resonant antenna 211.

Such constructed, for example, 915 or 2.45 GHz transponder preferably comprises a linear dipole or folded dipole to absorb plenty of energy and to power supply and respond semiconductor circuit 220.

An important component of said super HF RFID transponder is antenna 210. In case of transponder running at high frequency (400 MHz–25 GHmz) the most important properties are orientation and bandwidth of the antenna; and it usually depends on gains of half- or multiple half-wavelength dipole antenna.

General micro strip dipole antenna has very low radiation-resistance to result low efficiency which is inadequate to form credit card, although it is overcome by using relatively thick plate.

Therefore, an embodiment of the present invention is a tapered slot antenna suitable to a remote RFID transponder metal antenna 210 equipped inside a credit card.

Such metal antenna 210 is fully flat and has end-fire pattern; provides high orientation and bandwidth; is practically prepared by a thin plate; shows good radiation pattern and radiation gain; and reduces functional loss by TMO surface wave.

Also, said tapered slot antenna 213 is a horn shaped antenna having slot width progressively extended in steps and radiates electro-magnetic wave parallel to side of the antenna.

Since the structure of such antenna 213 is similar to the slot line, the contact area thereof is located onto the micro strip line.

Therefore, as the antenna can be simply integrated with any feeder and conformity circuit it is preferably used as a broad-bandwidth antenna element for the remote identification HF transmitting/receiving system.

Figure 12:
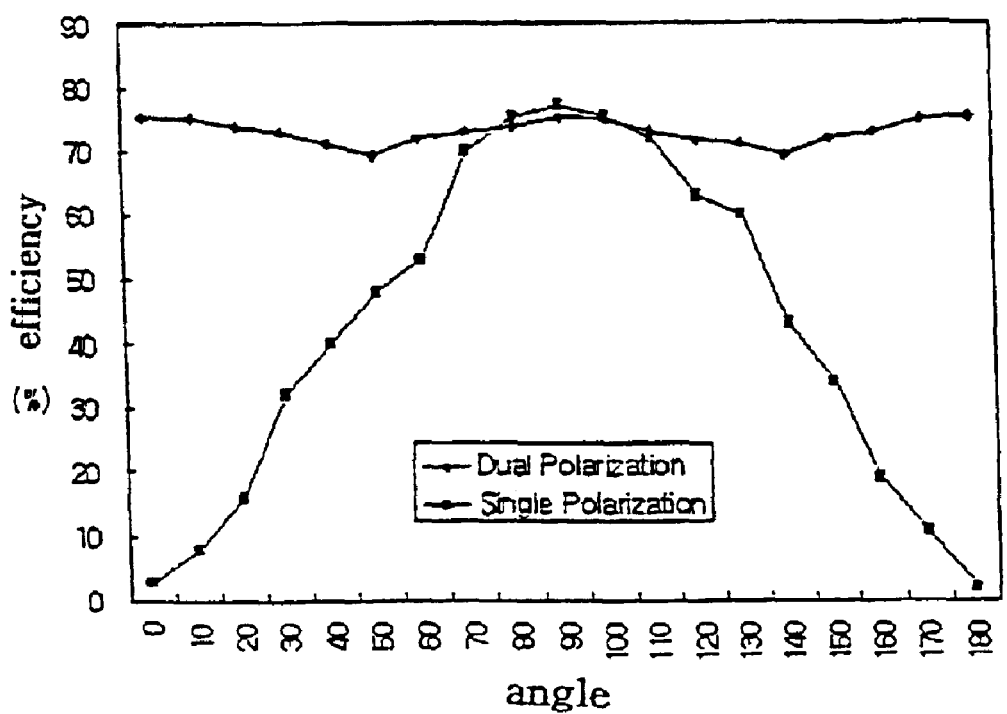
FIG. 12 illustrates a comparative graph corresponding to directions of the antenna.

Receiving power of the antenna is proportional to area as a gain calculation formula applied to micro strip antenna;

By arranging two slot antennas 212 perpendicular to each other, as illustrated in FIG. 12 as a comparative graph for orientation, it can overcome the orientation trouble; and at both end sides thereof comprises two dipole antennas 211 to complete a resonant circuit to obtain maximum gain.

[Example 2]

In this example as another embodiment of the present invention, an electronic fare collection system for driving automobiles such as toll road charging system (referring hereinafter "charging system") using a remote RFID built-in credit card (referring hereinafter "RFID credit card") prepared by Example 1.

Figure 13:
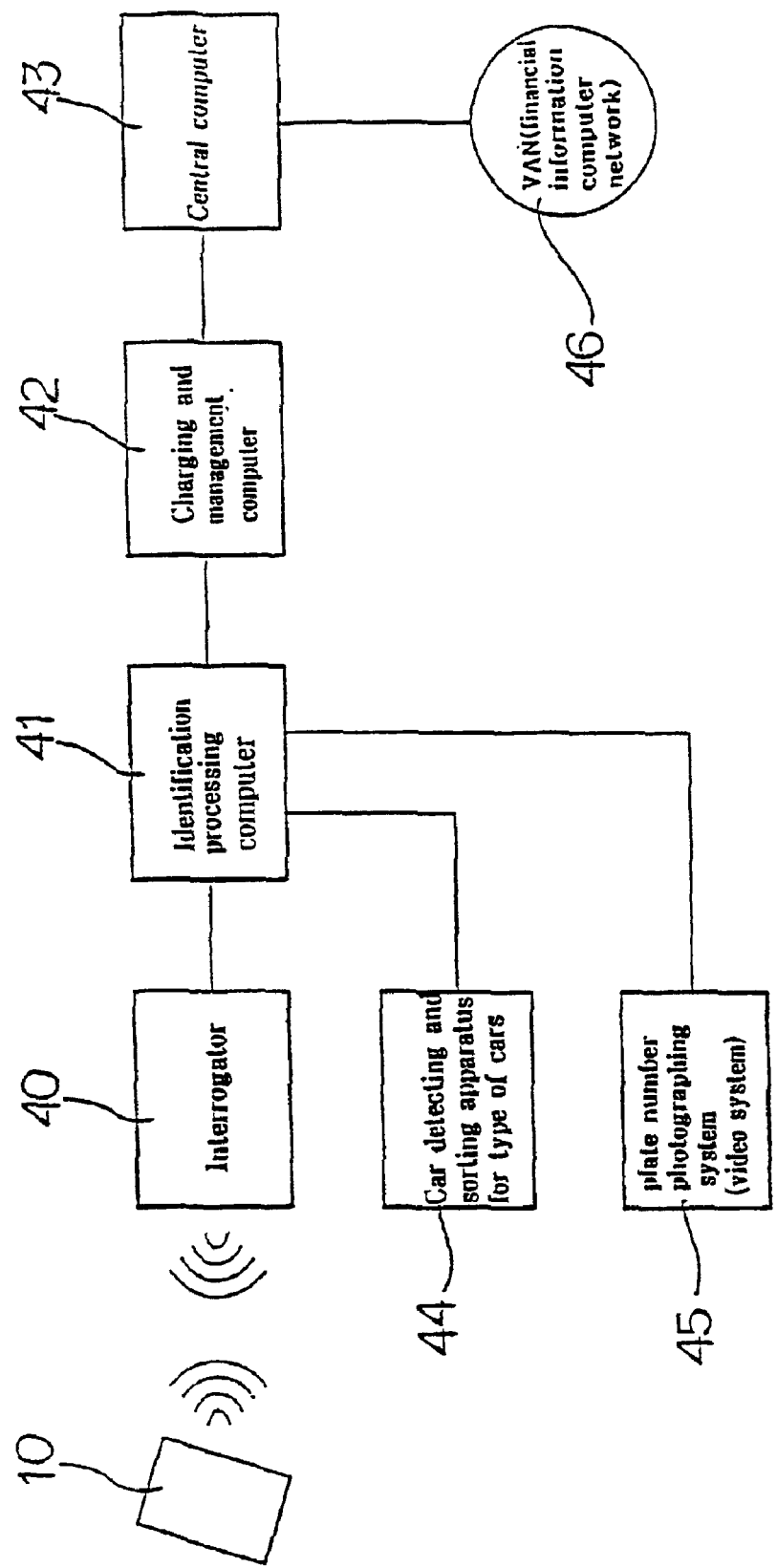
FIG. 13 is a block diagram schematically illustrating automatic tollgate system utilizing a remote RFID built-in credit card according to the present invention.

FIG. 13 illustrates a systematic drawing of the charging system using RFID credit card 10, the charging system being consisted of an interrogator 40 to directly identify the RFID credit card 10 placed within the driving automobile without any kind of automobile loading means; a detector 44 to detect and sort type of the automobile; a video system 45 to photograph plate number of illegally passing car; and an identification and control computer 41 to identify the RFID credit card of the automobile passing the tollgate. The system further includes a known management computer 42 to collect fare to receive data transmitted by the identification computer 41, a central computer 43 and a financial information computer network (VAN) 46.

Figure 14A:
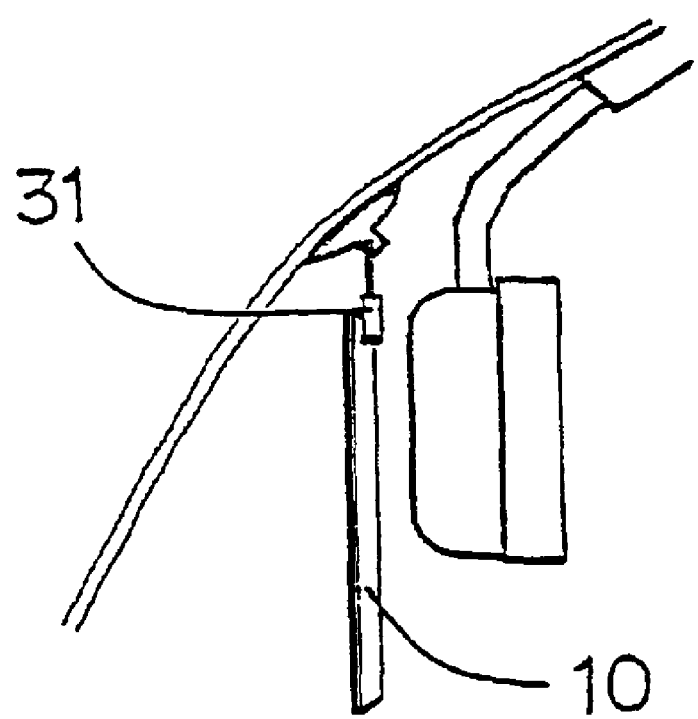
FIGS. 14a, 14b and 14c are drawings partially illustrating vehicles equipped with such RFID credit card o shown in FIG. 13 according to the present invention.
Figure 14B:
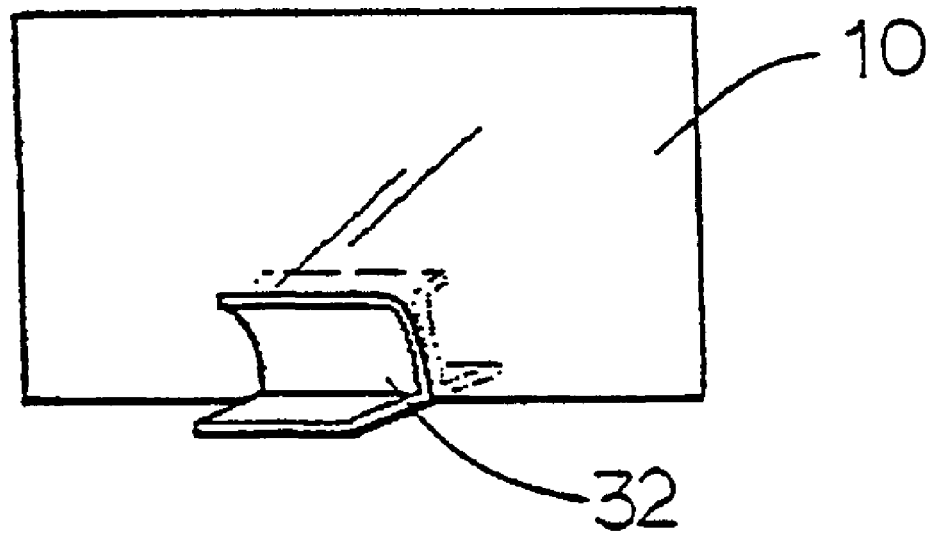

In order to show intention to pay the fare, an user can insert or hold the RFID credit card 10 on a card holding stand 32 and place it on the dashboard of car (as shown in FIG. 14*b*), install a card clip 31 made of PVC material behind the room mirror (as shown in FIG. 14*a*) or insert the card into a card pocket 33 made of clear vinyl material.

Additionally, said RFID interrogator 40 is positioned in a level of 4.5 m from the road ground at upper center part thereof, and a camera 45*a* of the video system 45 is located at the same level but 20 m backward from it; and at cross road both of them being arranged to Beacon orientation opposite to each other to reduce mutual interference to a minimum degree.

Such construction of the present invention can transmit Beacon together with question at the interrogator 40; encode the card inherent number and information of the entered car and respond to it by means of RFID credit card 10 acting with the power of Beacon when a car placed with RFID credit card 10 is entering to the Beacon area; read the card inherent number and information transmitted from the RFID credit card 10 by means of interrogator 40 then send the read data to the computer 41. The computer 41 receives information relating type of the car transmitted by the detector 44 to detect and sort type of the car, calculates fare of the corresponding car, passes the information identified of the credit card through the known management computer 42 and the central computer 43 and asks usage approval to particular capital firm corresponding to the card.

If "Disable" result accepted from the capital firm, any alarm lamp or other output device immediately indicates the result to the user. Also, in case of the detection result being identified from the detector 44 without identification of RFID credit card 10, the car is classified as an illegally passing car, alternatively, in addition to indicate "Disable" for the card.

The management computer 42 collects corresponding information to fine penalty by every cars from the identification computer 41 and manages it; asks usage approval of card to a CPU connected with the management computer 42; searches a database including "disable" cards and transmits the searched result to VAN 46. The central computer 43 manages and controls penalty fining information and billing information to capital firms and is connected to capital firms through VAN 46.

Figure 14C:
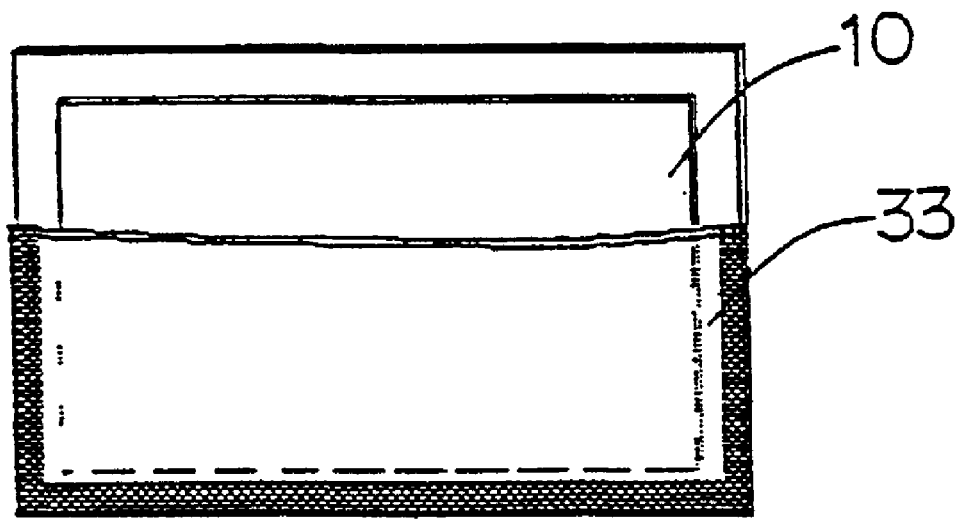

In order to efficiently identify RFID credit card 10, it is possible to set card clip 31 made of PVC material on beyond the room mirror (as shown in FIG. 14*a*) or make and set a card holding stand 32 on the dashboard of car (as shown in FIG. 14*b*) to easily recognized from front side of the car. Or a card pocket 33 made of clear vinyl material (as shown in FIG. 14*c*) is attached to a desired location on the front glass of car to hold RFID credit card 10 and show intention to pay the fare.

Figure 15A:
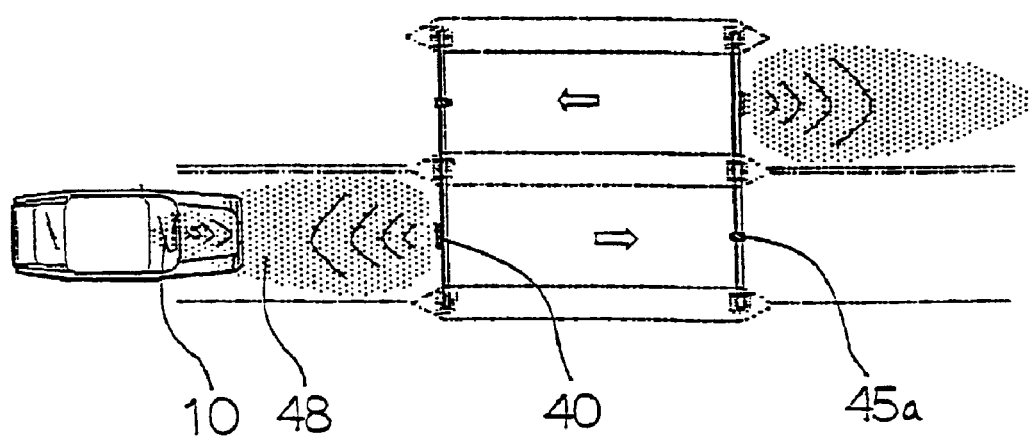
FIG. 15a is a plan view illustrating the direction of RF signal stream and the identification area in such tollgate structure according to the present invention.
Figure 15B:
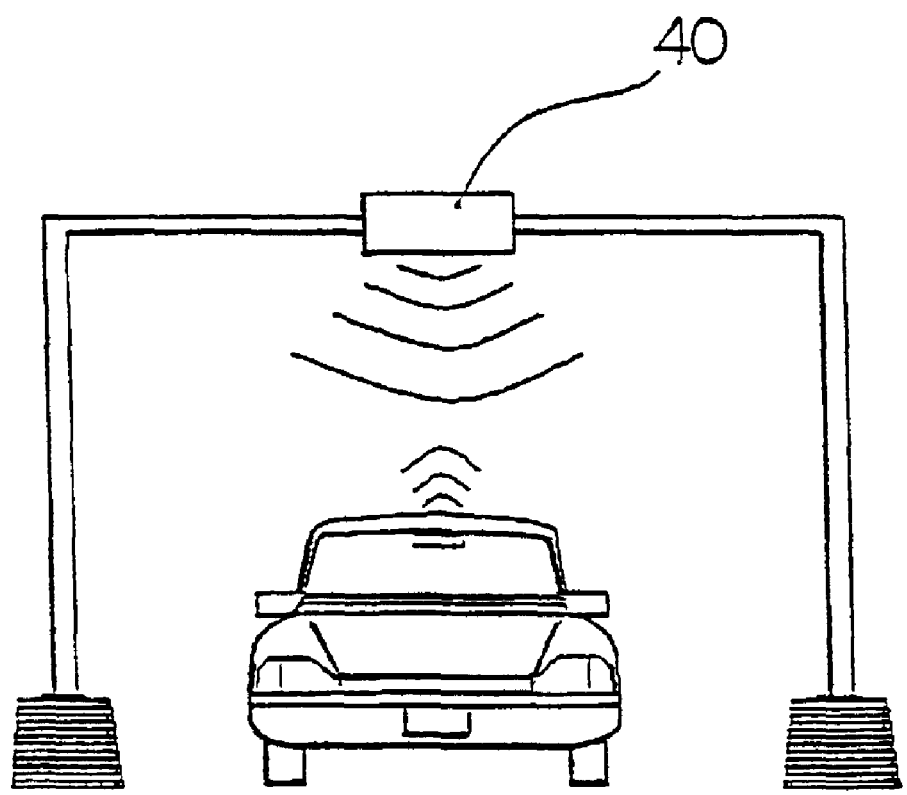

The interrogator 40 and the video camera 45*a* to identify RFID credit card 10 placed in the driving car is arranged as illustrated in FIG. 15*a*. Identifying areas located in opposite directions of both road are crossing each other. The interrogator 40, as shown in FIG. 15*b*, is located on a level at center of the road to allow cars including large-sized vehicles able to pass through to form an effective system.

As another embodiment of the present invention, it will be understood that the present invention is applicable to automatic charging systems for parking lot and/or gas station comprises a remote RFID interrogator 40 to directly identify RFID card 10 in car which is not to be construed as limiting the present invention within the sprit and/or scope of the claims.

The present invention was developed as a solution to overcome the existing problems in connection with restricted identification range, errors caused by frequency shift resulted from Doppler effect occurred in the transponder moving at high speed within the detection area. Also, the present invention can be applicable to moving objects identification systems for long or short distance such tollgate charging system.

The present invention has advantages of having a constant gain value by developing a high-gain dual polarizing antenna for a small credit card type passive transponder to identify at long distance, independently to any direction of the transponder; improving gain values than conventional transponder tag antenna by 6–9 dB to ensure a sub-permanent life time by providing the desired identification performance by means of a small credit card type passive transponder without power supply; and being applicable to any systems to identify and distinguish high-speed moving objects. It will be appreciated that the present invention can be used in various applications such as tollgate charging system, parking management system, admission(entrance and exit) management system, automatic member identification and management systems of gas station and the like by the improvement of passive transponder techniques and appearance of various applicable systems according to the present invention.

Particularly, the present invention provides the performance to charge tollgate (or toll road) fare by using a credit card installed with RFID function, which enables smoother and faster traffic stream than prior known manual charging or mechanical charging systems by about 4 times. Also, the inventive system has a communication speed equal to that one of a way using car loading device previously used in advanced countries but is more preferable in the economical aspect thereof since it needs not the high-priced loading device about 40 times of card price. Of course, it requires no purchase of the car loading device.

The inventive RFID credit card can be provided as a substitute for the existing one by capital firms, thus, lead to rapid distribution of the electro-charging system. Therefore, the present invention can save enormous operating expenditure because it eliminates the requirement of 3.5 human labors per road caused by using previous manual charging systems under bad working conditions such as smoke, safety problems and so on, in addition to, reduce excessive opportunity loss, storage and traffic costs by reducing stopping time of cars at the tollgate if quickly spreading the present invented systems.

Among other applications, the present invention is efficiently utilized in such as auto-identifying and paying system, management and charging system and the like useful for parking lot.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A passive transponder identification system for detecting and monitoring the existing of automobiles and other object within a constant detection area comprising a transmitter 100 to radiate two different radio frequency (RF) signals within the area to a transmitting antenna 110, either of the signals being modulated to a fixed low frequency (LF) and an antenna 210 modulated with two different center frequencies; wherein an impedance semiconductor circuit part 220 inserted into said modulated antenna combines said two RF signals; and the identification system further includes a transponder 200 having a tank circuit to contain a resonant frequency equal to sum of two different frequencies to re-radiate a data-tone carrier signal to such combined frequency and a narrow-bandwidth receiver 300 having a receiving antenna 310 to receive and demodulate said carrier signal by excluding the transmitting RF signal and its harmonics to detect LF modulating signal.

2. The system according to claim 1, wherein the system detects a digital data signal overlapped by the narrow bandwidth receiver 300 which is a means to start the digital stream preset to indicate the exist of the transponder 200 within the detection area whenever the intensity and duration of the signal occurred in the transponder 200 and detected by the narrow bandwidth receiver 300 exceed minimum values thereof.

3. The system according to claim 1, wherein LF modulation as one of the transmitted RF signals is a tone-modulated high frequency (HF) wave f1 generated by the narrow bandwidth frequency modulation, the other of the RF signals transmitting a continuous wave among the fixed RFs.

4. The system according to claim 3, wherein LF modulation comprises the continuous tone-modulation RF signals and makes those to be within a defined frequency range.

5. The system according to claim 1, wherein the transponder 200 comprises a charge pump circuit 230 connected to a longitudinal part placed in a space surrounded by close loop area faced each other to provide the tank circuit to tune with the second harmonics resonant frequency; and a dielectric folded dipole antenna 210 and a non-linear impedance semiconductor circuit 220.

6. The system according to claim 5, wherein the non-linear impedance circuit connects both sides of closed loop area at one end of the antenna in order to form a tuning tank circuit having a frequency higher than the selected frequency by 2 limes as the resonant frequency thereof.

7. The system according to claim 1, wherein the narrow-bandwidth receiver 300 comprises the receiving antenna 310 for carrier signal; a filter 311 to block all signals other than the narrow-bandwidth signal generated at the transponder resonant frequency; a demodulator detecting signal width by comparing width of the filtered carrier signal and running the comparison-determination output, detecting LF modulation only when said comparison-determination output exceeds the preset reference level and responding dependent on the comparison-determination of a comparator 312.

8. The system according to claim 7, wherein the modulation detection responds to LF modulation to activate the date stream output for minimum time after starting said LF modulation detection.

9. The system according to claim 7, wherein it includes a band pass filter 311 to prevent signals except the one within the narrow-bandwidth received by the receiving antenna 310 and generated in the resonant circuit of the transponder, a series of means to produce intermediate frequency IF for demodulating signals within the pass-band of said filter 311; alternative amplifiers 321,322 to compare and determine width of IF; and a narrow-bandwidth correction discriminator 323 to respond depending on the comparison-determination output to demodulate said IF to allow the comparator 312 to generate LF signal only when the width of comparison-output exceeds a pre-determined threshold.

10. The system according to claim 9, wherein LF modulation as one of RF signals within narrow RF deviation limits comprises a constant tone-modulation; the narrow-bandwidth receiver 300 accepts a phase locked telecommunication way by VCO 324 to tune with said constant tone frequency and activate an amplifier 340 connected to the output to allow digital data stream to run for a constant period.

11. A system to detect cars or other objects existing within the detection area comprising a transmitter 100 to run and radiate radio frequencies (RFs) having a narrow-bandwidth by using a carrier frequency modulated by a certain LF tone; wherein the system includes a transponder 200 to respond the signal from the transmitter 100 to be radiated by the transmitter 100 to run and re-radiate the carrier signal by different harmonics; the re-radiated signal comprising a fixed LF tone produced by adding a data stream to the LF tone; the system further comprises a receiving system 300 having a narrow-bandwidth filter 311 to contain the carrier signal re-radiated at said harmonics so that it produces filtered output corresponding the re-radiation signal received by an antenna 310 to receive said re-radiated carrier signal and to prevent the signals including ones of even the frequencies other than the narrow-bandwidth received by the antenna 310; and having a demodulation means responding to the comparison level of the output to generate LF modulation signal and demodulate the filtered output even when the comparator 312 exceeds the preset threshold value and runs.

12. The system according to claim 11, wherein the receiving system has a series of demodulating means to respond to the detection of LF modulation activating output for minimum time after starting the monitoring of LF demodulation signal.

13. The system according to claim 11, wherein RF signal having narrow bandwidth comprises a stable carrier modulated by a fixed audio-tone; said narrow bandwidth filter 311 includes a local oscillator 314, a mixer 319 to drive the intermediate frequency signal and a correction filter 324; a series of means run by comparison-determination process within the pass-band for amplifying the intermediate signals to modulate the signal from the correction filter 324 detects width corresponding to the output width from such correction filter 324; such multiple modulating means comprises a clamp circuit 325 responding to the comparison-determination to fix the outputs from a narrow-bandwidth frequency discriminating device and a correction discriminator 323 so that a fixed tone modulation signal is generated during output process; and the comparison-determination by the comparator 312 being excluded when the determined value exceeds the threshold value.

14. The system according to claim 11, wherein the receiving system 300 includes several demodulating means to run the digital data stream output for a constant period and the digital code stream ranged of 64 bits to 16 kilobits dependent on memory circuit attached within the passive transponder 200.

* * * * *

UNITED STATES PATENT AND TRADEMARK OFFICE
CERTIFICATE OF CORRECTION

| | | |
|---|---|---|
| PATENT NO. | : 6,894,624 B2 | Page 1 of 1 |
| APPLICATION NO. | : 10/049458 | |
| DATED | : May 17, 2005 | |
| INVENTOR(S) | : Ji-Tae Kim et al. | |

It is certified that error appears in the above-identified patent and that said Letters Patent is hereby corrected as shown below:

Front Page, Section (54), change "PASSIVE TRANSPONDER IDENTIFICATION AND CREDIT-CARD TYPE TRANSPONDER" to --PASSIVE TRANSPONDER IDENTIFICATION SYSTEM AND CREDIT-CARD TYPE TRANSPONDER--.

Column 13, line 67, change "limes" to --times--.

Column 14, line 13, change "date" to --data--.

Signed and Sealed this

Twenty-first Day of August, 2007

JON W. DUDAS
*Director of the United States Patent and Trademark Office*